Figure 1:
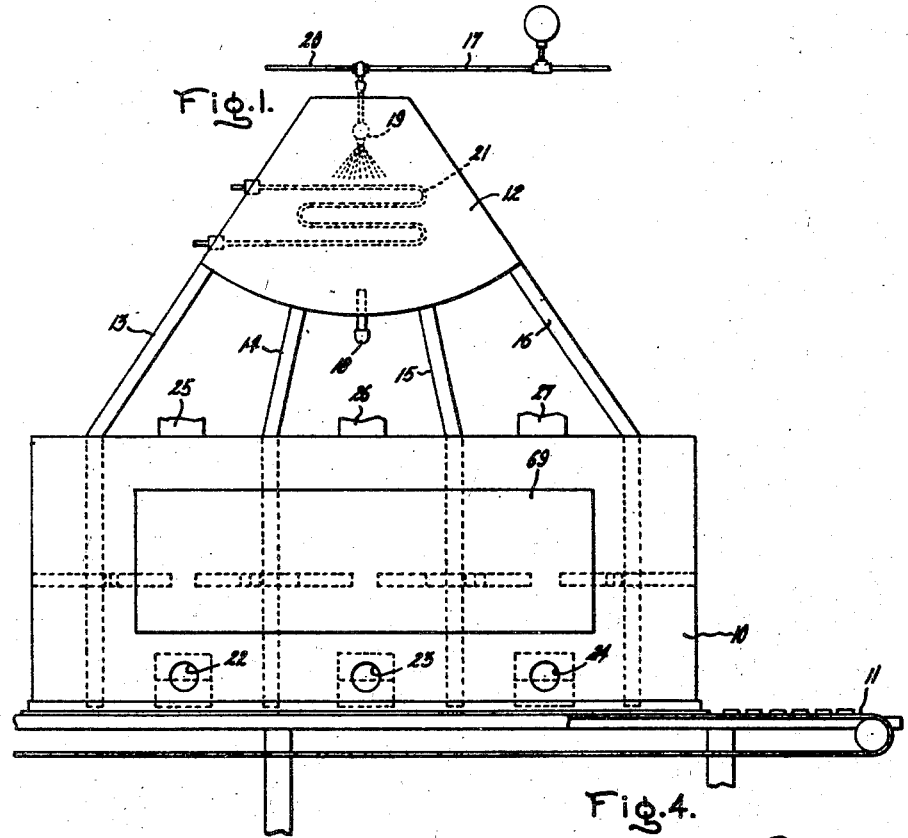

Inventors:
Cleveland Scudder Smith, Jr.,
Leonard A. Seder,
by Harry E. Dunham
Their Attorney.

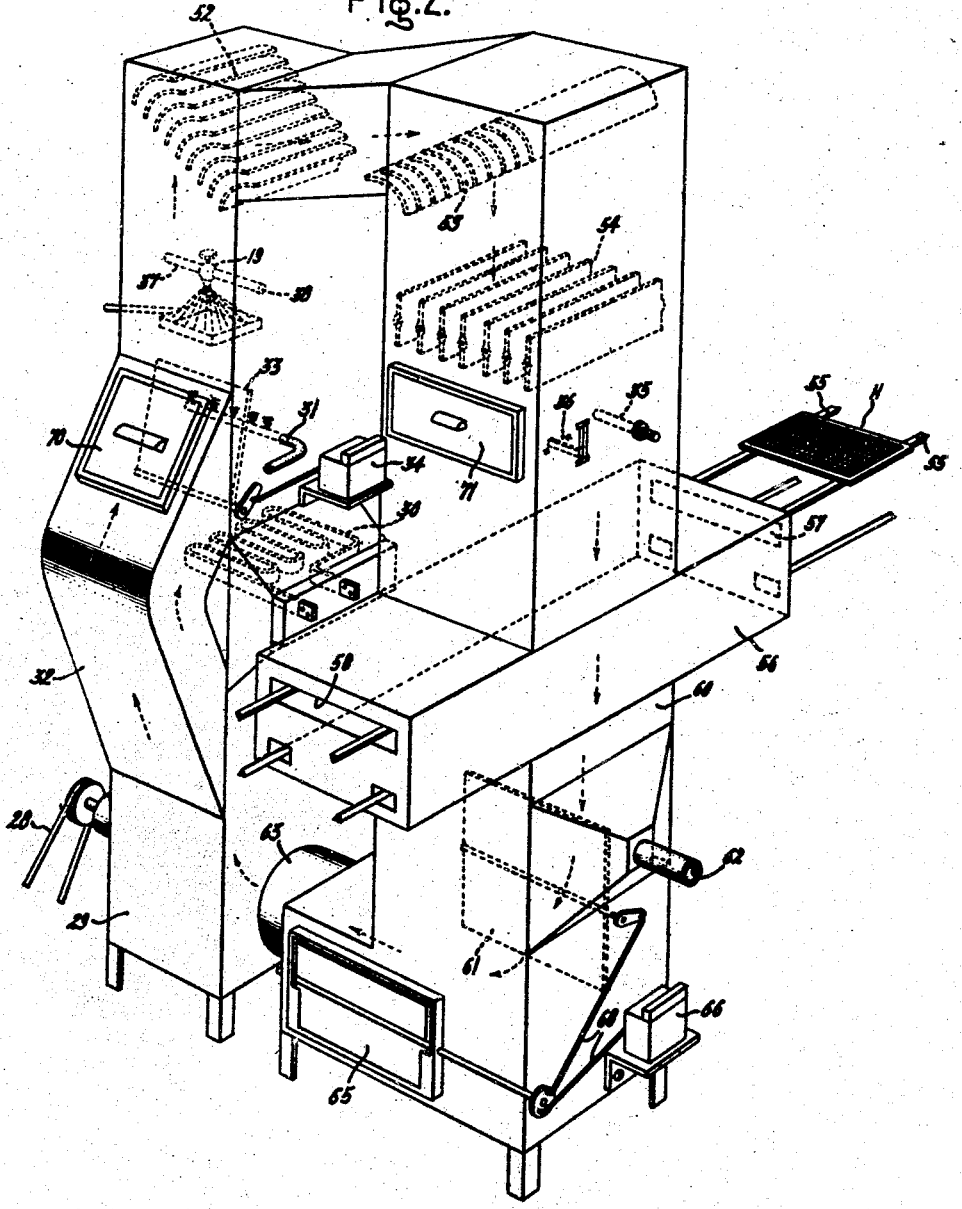

Patented Mar. 25, 1947

2,418,055

UNITED STATES PATENT OFFICE 2,418,055

APPARATUS FOR TREATING SELENIUM RECTIFIERS

Cleveland Scudder Smith, Jr., Bartlett, Tenn., and Leonard A. Seder, Lynn, Mass., assignors to General Electric Company, a corporation of New York Application December 31, 1943, Serial No. 516,370

4 Claims. (Cl. 91—18)

The present invention relates to the manufacture of rectifying devices of the selenium type, such for example, as described in Hewlett U. S. Patents 2,334,554, patented November 16, 1943, and 2,337,329, patented December 21, 1943.

It is the object of our invention to improve the characteristics of selenium rectifiers and to cause selenium units to have greater uniformity during the course of manufacture.

Heretofore, the so-called "blocking layer" has been produced on selenium units in the fabrication of rectifiers by subjecting the selenium units in the open air to chemical reaction with an aqueous solution of hydrogen peroxide, which was applied as a spray. This method of forming the rectifying blocking layers when applied to groups of selenium rectifier units, although constituting an improvement over earlier forming processes, is subject to some unavoidable variations from day to day. Various factors contribute to these variations. The temperature of the selenium elements and of the aqueous spray markedly effects the extent to which the desired chemical reaction takes place. A spray, of course, consists of liquid droplets. The humidity of the surroundings, the temperature and other conditions determine the length of time needed to reevaporate the liquid from the surface of the selenium element, and are not easily controlled. This time interval is quite critical in its effects on the amount of blocking resistance built up on the selenium cell.

It is frequently desired to control precisely the chemical reaction already mentioned in order to manufacture elements with specified resistance. The aqueous spray method does not permit sufficient latitude in adjustment to enable accurate predetermination.

As an additional limitation of the spray method, it has been found to be extremely difficult to obtain uniform treatment of all selenium elements within a given group during any particular time, apparently because of the inability of the spray to wet all such elements completely uniformly and with exactly the same quantity of solution. Indeed, the selenium surfaces vary in ability to be wetted by the solution.

We have discovered that the blocking layers can be rendered more uniform with respect to one another and the forward and reverse conductivity characteristics and the stability of such units can be improved by carrying out the formation of the blocking layers in a gaseous oxidizing medium which is more actively oxidizing than atmospheric oxygen, as, for example, in a current gaseous hydrogen peroxide, ozone or nitrogen dioxide.

We have further discovered that the variations in forming treatment can be largely eliminated if provision is made to obtain constant elevated temperature and constant humidity of the gaseous agent during the treatment.

We have found that the formation of the blocking layer can be controlled to a predeterminable extent by varying the temperature of the gas or vapor, and even the concentration of solution from which it is generated.

Our invention provides an apparatus for carrying out the treatment of selenium cells with a gaseous medium, the novel features of which will be pointed out with particularity in the appended claims.

A complete understanding of our invention may be had from the following description when taken in connection with the accompanying drawings.

Figure 3:
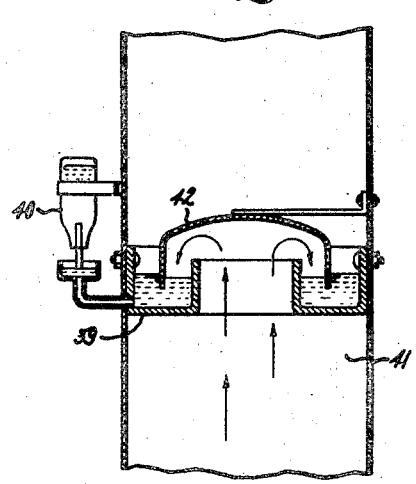
Figure 4:
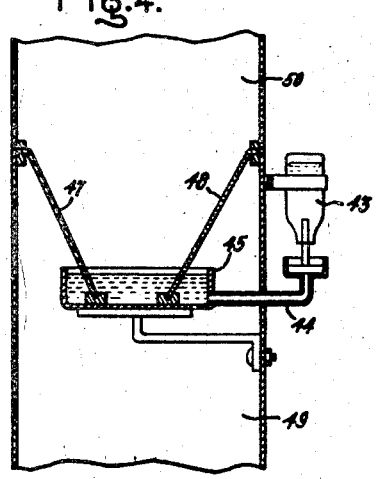

The accompanying drawing shows in Fig. 1 somewhat diagrammatically a front elevation of an apparatus suitable for carrying out our invention; Fig. 2 is a perspective view of a modification; and Figs. 3 and 4 are detail views of alternative devices for gasifying a liquid-oxodizing medium.

The apparatus in Fig. 1 comprises a tunnel-shaped treating chamber 10 through which passes a conveyor 11 for the articles to be treated. The treating chamber communicates with a heated gasifying chamber 12 whereby air containing suitable oxidizing gas, such as gaseous hydrogen peroxide ($H_2O_2$) is delivered. The gaseous mixture is conveyed to the treating chamber by the conduits 13, 14, 15, 16 and flows into contact with the articles to be treated. Air under pressure is admitted to the chamber 12 at 17 and 18. The air conduit 17 is connected to a suitable nozzle 19 which also is connected to a liquid-feed pipe 20.

Hydrogen peroxide solution is delivered to the chamber 12 by the spray nozzle 19, into which also flows air under pressure delivered by pipe 20, and which converts the hydrogen peroxide solution into a mist of minute droplets. The liquid droplets are vaporized by a heater 21 inside the chamber 12, and the resulting vapors mix with the air. Although heating speeds up the evaporation of the solution and the oxidation process, it is not indispensable. A temperature above ordinary room temperature, however, is preferred. The gaseous mixture leaving the mixing chamber should have a temperature of about 90 to 110° F. The concentration of $H_2O_2$ should be about one to ten milligrams per liter of air. Hydrogen peroxide dissolves in water to a concentration within a range of 3 to 30 per cent. This solution may be delivered by the pipe 20. When an aqueous solution of peroxide is employed, the water component when vaporized serves to humidify the air to a desirable extent. It is preferable in some cases to employ alcohol as a solvent for the $H_2O_2$ because of its more rapid vaporizing properties.

When a normally gaseous substance is to be employed as the added oxidizing agent, such as ozone or nitrogen dioxide, it also may be introduced by one of the conduits 17 or 20, a liquid carrier being unnecessary. Humidifying the air is not essential when such gases are employed. The chamber 12 serves merely to mix the active oxidizer with air and heat the mixture to the proper temperature, correspondingly less heat being required when a gas is introduced than in the case of hydrogen peroxide solution.

The exit openings of the conduits 13—16 are located near the lower part of the treating chamber. The conduits are constricted so as to cause a uniform velocity of the gas current flowing therefrom. Thus the heated mixture of air and hydrogen peroxide vapor delivered to the conduits 13—16 impinge upon the surface of the selenium articles which are moving through the treating chamber on conveyor belt 11.

The selenium rectifier elements commonly consist of washer-shaped metal disks upon which a layer of selenium has been deposited by an evaporation process, as described in the above-mentioned Hewlett patents. The selenium-coated metal disks while in the treating chamber are subjected to the described mixture of hot air, preferably humidified, and the gasified hydrogen peroxide. They are introduced in any suitable manner, conveniently by the conveyor 11 constituted of an endless rotating belt which carries the elements into the treating chamber 10 where they remain for about one to three minutes and pass on to the next operation; viz., a metal spray. During the period of contact with the oxidizing gas mixture, a so-called blocking layer is formed on the selenium by an oxidation reaction. As the selenium elements pass through the treating chamber 10, they are subjected not only to the air streams containing hydrogen peroxide which pass through channels 13—16, but also are subjected alternately to room air which is drawn into the treating chamber 10 through ports 22, 23 and 24, the gases finally being exhausted through the conduits 25, 26 and 27. Subsequently a counterelectrode is suitably applied upon the blocking layer of the selenium, for example, by apparatus (not shown) for applying spray deposition of metal, such for example as Wood's metal.

In Fig. 2 is shown a modified apparatus in which all or a portion of the air carrying the highly oxidizing vapor is recirculated and which embodies other novel features. In order to maintain more exactly such conditions as temperature, humidity, and gaseous concentration, the gaseous mixture is carried repeatedly through a circulatory cycle in which these physical conditions are controlled, preferably by automatic means.

By referring to Fig. 2, it will be observed that a stream of air is projected by a blower or fan (not shown) which is driven by the belt 28. The blower is located inside the chamber and only an external part has been indicated in order to simplify the drawing. It propels the air through a channel 29 containing a heater 30. The channel 29 also is provided with steam injection nozzles 31 for humidifying the atmosphere in the chamber. The heater 30 may be of any suitable form. For example, the heater may consist of an electric resistance unit of the type commonly used in electric stoves or of a finned copper coil or tube commonly used in air conditioning apparatus, or it may take the form of a conventional steam pipe heater.

As the air stream approaches the heater 30, a part of the air will be by-passed through channel 32, the amount of by-passed air depending upon the setting of the damper 33. The damper is operated by a conventional modulating type damper control motor 34. The motor 34 may be electrically controlled by a thermostat 35 which is responsive to the temperature of the gas mixture just before it comes into contact with the selenium elements. The degree of humidity also may be automatically controlled by suitable humidity-responsive device 36 which closes a valve in the steam supply pipes 31 when the humidity is high enough, and conversely opens this valve when the humidity is too low. When the humidity is too high, the humidostat 36 operates dampers to reduce it, as will be explained hereinafter. Such devices and their circuits are well known and hence have not been shown in order to simplify the drawing.

The air, properly humidified, passes the region of the atomizer 19 whereby a solution of hydrogen peroxide from a pipe 37 is atomized by compressed air introduced by a pipe 38 to the atomizer 19. Hydrogen peroxide or other oxidizing medium may be introduced in any other way into the air stream.

In Fig. 3 is shown an arrangement whereby air may be caused to bubble through a solution of hydrogen peroxide. The hydrogen peroxide solution is applied to an annular trough 39 by a container 40. Air under pressure is supplied by a conduit 41. It bubbles through the solution in the trough, passing between the trough 39 and a hood 42 through holes in the side walls of the hood, as indicated by the arrows. In its passage through the liquid, it becomes charged with $H_2O_2$ vapor. If the $H_2O_2$ is dissolved in water, the air also becomes humidified.

In Fig. 4 the solution of $H_2O_2$ is supplied from a container 43 through a pipe 44 to an open pan 45. Into the liquid in the pan 45 are dipped ends of strips of porous material 47, 48 which have sufficiently high capillarity to remain wetted by liquid drawn from the pan 45. The strips 47, 48 may consist of linen, cotton, plastic material or of a porous ceramic product.

Air, or other suitable gas, is supplied by a conduit 49, and in its passage over the wetted members 47, 48 becomes charged with vapor and then passes on by a conduit 50 to be heated, then to come into contact with the articles to be treated, etc., as described in connection with Figs. 1 and 2.

Referring again to Fig. 2, the heated air stream charged with the vapor flows through the channel 29 over fixed baffles 52 and 53 whereby it is directed downwardly over another set of baffles 54, the latter being adjustable. These baffles insure a more uniform distribution of the stream of modified air. As indicated by arrows, the stream of heated air suitably humidified and containing $H_2O_2$ finally comes in contact with the selenium-coated rectifier elements on the conveyor 55. The conveyor 55 enters the treating chamber 56 through a small aperture 57 and leaves the apparatus through an exit aperture 58. As these two apertures are relatively narrower in proportion to the space in the treating chamber and as the stream of air therethrough is under some superatmospheric pressure, the effectiveness of the oxidizing process on the washers as they pass through the chamber 56 is not seriously diminished. It is not, therefore, considered necessary to provide closure doors for the small orifices through which the conveyor passes.

After passing over the selenium-coated elements on the conveyor, the air continues on a downward path, as indicated by arrows, toward the bottom of the apparatus from which region it enters a conduit 60. At this region is provided another damper or door 61 adjusted to be opened and closed. Also, at substantially the same location in the chamber is an exhaust conduit 62 to the outside atmosphere. When the adjustable damper or door 61 is in a horizontal position, the humidified air is exhausted to the atmosphere through the conduit 62. If the damper 61 is open, that is, in a vertical position, the air continues to pass down to the bottom of the chamber. From here it is conveyed by the blower in the direction of the arrows through a conduit 63 back into the vertical channel and over the steam injection pipes, the atomizer and the fixed baffles, as before. As this operation continues, the humidified air containing the hydrogen peroxide vapor becomes more homogeneously charged and will more uniformly react with the selenium units on the conveyor.

Should the damper or door 61 be only partly opened, only a portion of the air will be exhausted through the exhaust pipe 62 and the remainder of the air will be recirculated as before.

The degree of relative humidity of the oxidizing atmosphere may vary from 40 to 70 per cent, depending on other variables, but the important point is that once a definite, predetermined temperature and humidity control has been established, maintenance of this standard may be regulated within very close limits by the arrangement of motor-controlled adjusting means above specifically enumerated.

The exact setting of damper 61 at any particular time is controlled by the setting of door 65, the latter being operated automatically by means of a motor 66 which, in turn, is motivated by the humidostat 36, as well understood. The door 65 opens to the atmosphere and its purpose is to admit outside air of low humidity should the humidity within the apparatus become too high. To permit this additional air to be drawn into the system, air is expelled at the exhaust 62, the rate of withdrawal being controlled by the setting of the door 65. The dampers 61 and 65 are shown as interlocked by the mechanism 68 so that the motor 66 moves them both in synchronism. When 61 is vertical and hence is open, the damper 65 is closed. In this position complete recirculation occurs. When 61 is horizontal and hence is closed, the damper 65 is wide open. All the air current can leave by 62. For various intermediate positions partial recirculation occurs, part of the mixture being exhausted and replaced by room air which is admitted at 65. Suitable doors 69 (Fig. 1) and 70, 71 are provided in the apparatus for access to the various parts in case such access is found desirable.

What we claim as new and desire to secure by Letters Patent of the United States is:

1. An apparatus for treating rectifier elements comprising the combination of a treating chamber provided with charge and discharge ports open to the atmosphere, a mixing chamber having an air inlet opening, a heater in said mixing chamber, a conduit connecting said chambers, means for producing a substantially liquid-free mixture of a gaseous oxidizing agent and air in said mixing chamber to produce a desired surface condition on rectifier elements, and a conveyor for introducing elements to be treated into said treating chamber and discharging said elements from said chamber after a predetermined time interval.

2. An apparatus for treating rectifier elements comprising the combination of a mixing chamber having an air inlet, a heater for air admitted by said inlet, means for humidifying air in said chamber, means for associating the humidified air with an additional oxidizing gas, a treating chamber having inlet and outlet ports open to the atmosphere, a conveyor entering and leaving said chamber through said ports, for introducing thereinto and removing therefrom articles to be treated, means for producing circulation of gaseous contents from said mixing chamber to said treating chamber and means for exhausting some of the circulating gas and replacing the same with atmospheric air.

3. An apparatus for treating rectifier elements comprising the combination of a treating chamber having ports open to the atmosphere, a conveyor entering and leaving said chamber by said ports for conducting rectifier elements through said chamber, a mixing chamber having an air inlet, means for heating air admitted thereby, means for introducing water vapor and a highly oxidizing gas into said mixing chamber, conduit means connecting said treating and mixing chambers, means for causing a current of gases from said mixing chamber to impinge on elements to be treated in said treating chamber and means for discharging said elements from said treating chamber after the lapse of a predetermined time interval.

4. An apparatus for producing current-blocking layers on selenium units which comprises the combination of a casing having inlet and outlet openings and providing a main loop-shaped channel, a heater therein, a branch channel communicating with said main channel and by-passing said heater, dampers for controlling the passage of gas through said by-pass channel, means for supplying water vapor and oxidizing gas to said channel, means for producing circulation of gases in said loop-shaped channel, and a conveyor for introducing into said channel and removing therefrom by said inlet and outlet openings articles to be subjected to contact with the gases in said channel.

CLEVELAND SCUDDER SMITH, JR.
LEONARD A. SEDER.

REFERENCES CITED

The following references are of record in the file of this patent:

UNITED STATES PATENTS

| Number | Name | Date |
|---|---|---|
| 573,206 | Chavez et al. | Dec. 15, 1896 |
| 1,132,687 | Ryan | Mar. 23, 1915 |
| 1,535,850 | O'Hara | Apr. 28, 1925 |
| 1,828,985 | Shinkle | Oct. 27, 1931 |
| 1,847,915 | Bailey | Mar. 1, 1932 |
| 1,935,383 | Ballantine | Nov. 14, 1933 |
| 2,097,885 | Hoppe | Nov. 2, 1937 |
| 2,188,940 | Diggary et al. | Feb. 6, 1940 |
| 2,349,622 | Hewlett | May 23, 1944 |

FOREIGN PATENTS

| Number | Country | Date |
|---|---|---|
| 181,355 | British | Mar. 22, 1923 |